(No Model.)

T. COOK.
REFRIGERATING APPARATUS BY MEANS OF AMMONIA AND OTHER SUBSTANCES.

No. 243,759. Patented July 5, 1881.

WITNESSES
P. C. Dieterich
Fred. G. Dieterich

INVENTOR
Thos. Cook
per H. Lloyd Wiegand
ATTORNEY

UNITED STATES PATENT OFFICE.

THOMAS COOK, OF PHILADELPHIA, PENNSYLVANIA.

REFRIGERATING APPARATUS BY MEANS OF AMMONIA AND OTHER SUBSTANCES.

SPECIFICATION forming part of Letters Patent No. 243,759, dated July 5, 1881.

Application filed October 22, 1880. (No model.)

*To all whom it may concern:*

Be it known that I, THOMAS COOK, of the city and county of Philadelphia, and State of Pennsylvania, have invented certain new and useful Improvements in Refrigerating Apparatus by Means of Ammonia and other Substances; and I do hereby declare the following to be a sufficiently full, clear, and exact description thereof to enable others skilled in the art to make and use the said invention.

My invention relates to that class of refrigerating apparatus in which compressed or liquefied gas is permitted to re-expand and absorb heat from surrounding fluids or air.

The nature of my invention consists in the introduction of tubes for confining, regulating, and directing the degree of expansion in different parts of the containing vessels or tubes, so that such a range of temperatures of external surfaces is secured as to avoid the formation of snow from the moisture condensed or precipitated from the atmosphere thereon impeding the conducting properties of the refrigerating-surfaces. Incidentally with the above-stated feature there are some details involving novel and useful combinations of constructions facilitating the making and maintaining of the joints in fluid-tight condition.

I will now proceed to describe my invention, referring in so doing to the drawings annexed and the letters of reference marked thereon.

Figure 1:
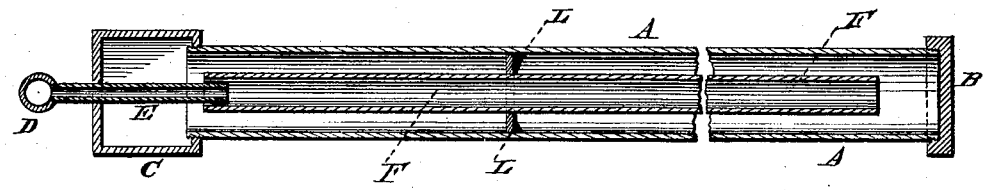
Figure 2:
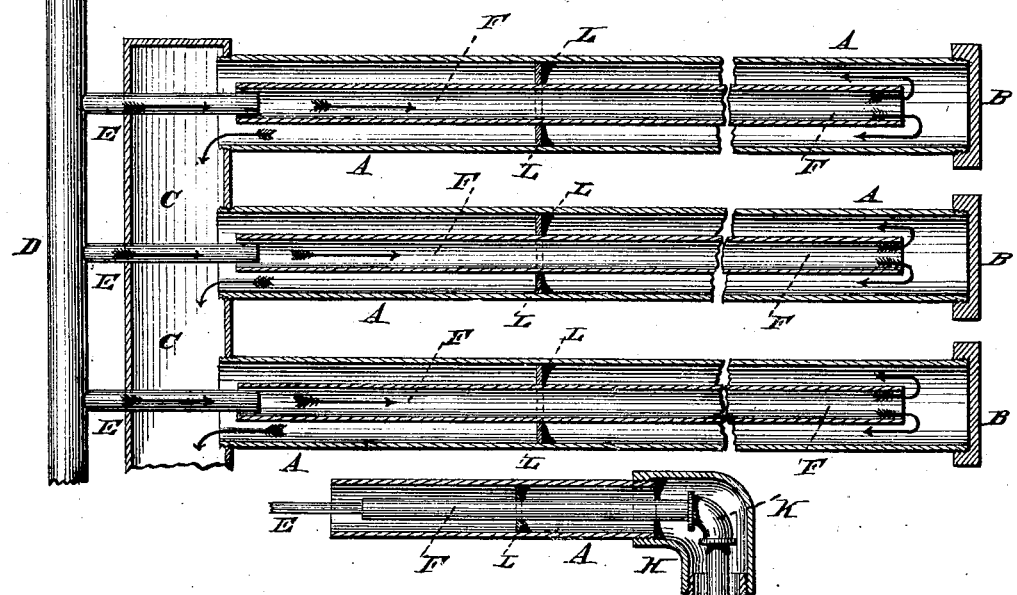
Figure 3:
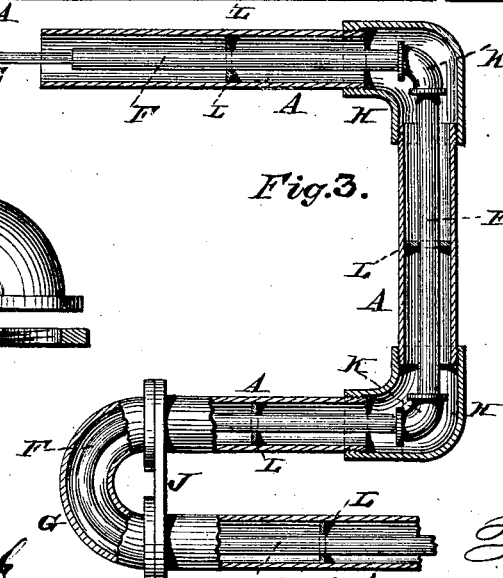

Figure 1 shows a sectional elevation of the invention; Fig. 2, a plan thereof; Fig. 3, a modification in plan view, and Fig. 4 a view of one of the terminal connections.

The same letters of reference apply to the same parts in the several figures.

Figure 4:
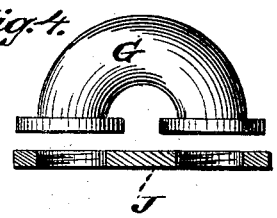

A represents pipes, closed at the ends B, as shown in Figs. 1 and 2, or connected in coils, as in Figs. 3 and 4. The several pipes A, as shown in Figs. 1 and 2, are connected in a fluid-tight manner in the manifold C, leading in the direction of the arrow to the compressing-pump inlet.

D is a smaller tube, receiving a continuous supply of liquefied or compressed gas, which passes in the direction of the arrows marked on the pipe D to the branches E, leading a short distance into the tubes A.

Around the tubes E, within the tubes A, I place, preferably in fluid-tight connection, at the end nearest the manifold C, the pipe F, extending nearly the entire length of the tube A.

The following proportions of tubes I have found satisfactory: E, three-eighths of an inch bore, F one and one-half inch bore, and A five inches bore and about one hundred feet in length. These dimensions may, however, be varied.

In the form just described the pipes A are shown as inserted in a manifold, C.

In the modification shown in Figs. 3 and 4 the pipes A are united by return-bends G and elbows H, (the return-bends are shown in detail, on enlarged scale, in Fig. 4,) and are not directly bolted thereto, but have a plate, J, interposed between them and the pipes A, which performs a double function—viz., bracing the adjacent pipes A A together and closing side or face of the return-bend, when it must necessarily be made open to pass over the pipes F. The elbows must be of such dimensions as to permit the smaller elbows K to turn therein. The pipes F are centered by spiders L in the pipes A.

The gas is introduced in liquefied or compressed state by the tube E, and, expanding rapidly on entering the tube F, flows continuously to the end of the pipe F, and returns in the annular space between F and A to the inlet-pipe of the compressing-pump. The expansion is most intense at entrance of the gas into the pipe F from the tubes E and least at the remote end of F. This is equalized and diffused evenly during the return of the gas flowing in the annular space between F and A, and the resulting temperature is such that air passing around the tubes A is efficiently cooled without depositing snow on the tubes.

The manifolds C may be protected by slow-conducting material, to avoid or retard absorption of heat, and the air guided around the pipes A by a box or chute.

Having described my invention and the mode of making and using the same, what I claim as my invention is—

1. The method of regulating or equalizing the temperature of refrigerating-vessels by guiding the expanding current of gas therein, substantially as set forth.

2. In an apparatus for refrigerating air by the expansion of gas or vapor in closed vessels, the combination of guiding-tubes arranged to prevent immediate contact with the exterior tube until after an expansion has developed in the inner tube.

3. The return-bend G and plate J, in combination with the pipes A, as and for the purpose set forth.

THOS. COOK.

Witnesses:
ALEX. H. SIEGEL,
J. DANIEL EBY.